Patented June 13, 1933

1,913,520

UNITED STATES PATENT OFFICE

FRIEDRICH STOLZ, KARL BÖTTCHER, AND JULIUS HALLENSLEBEN, OF FRANKFORT-ON-THE-MAIN-HOCHST, AND WALTER KROHS, OF BAD-SODEN, GERMANY, ASSIGNORS, BY MESNE ASSIGNMENTS, TO WINTHROP CHEMICAL COMPANY, INC., OF NEW YORK, N. Y., A CORPORATION OF NEW YORK

PROCESS OF PREPARING AMINO ALCOHOLS

No Drawing. Application filed October 23, 1928, Serial No. 314,537, and in Germany October 29, 1927.

The present invention relates to a process of preparing amino alcohols.

The preparation of aromatic amino alcohols by reducing aromatic amino ketones is connected with difficulties.

Now we have found that the said amino alcohols can be obtained in a technically simple manner by starting from basic ketones in which at least one hydrogen atom of the amino-group is substituted by the benzyl radicle or another aralkyl radical.

If, for instance, a benzylalkylamino ketone is hydrogenated with hydrogen in the presence of a metal-catalyst of the platinum-group, there is not only reduced the CO-group to CHOH but there is also split off the benzyl radicle as toluene and in its place hydrogen introduced, a fact which could not be foreseen according to what has hitherto been disclosed on the subject. The reaction may be explained by the following equation:

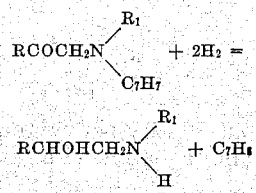

wherein R stands for an aromatic radical and $R_1$ stands for hydrogen or an aliphatic or an aralkyl radical. When starting from a dibenzylamino ketone there is obtained by the hydrogenation a primary amine.

The hydrogenation of the basic ketones aralkylated at the nitrogen may also be effected with the aid of a metal of the iron-group as catalyst and it proceeds rapidly and smoothly when it is carried out under pressure and at an elevated temperature. Among the metals of the iron-group nickel is especially suitable as a catalyst; it can be replaced wholly or partly by another metal of the iron-group, for instance: iron and cobalt without the reaction being disturbed thereby. Also copper may be employed as a catalyst. If there are used catalysts which do not belong to the group of the platinum metals, the application of pressure and of an elevated temperature is particularly advantageous; the most favorable temperature being one of about 100° C.

The amino alcohols prepared in the above-described manner and which are intended to be used for therapeutical purposes, are distinguished by their great purity.

Examples (1) Preparation of 1-(3′.4′-dihydroxyphenyl)-2-(N-methylbenzylamino)-ethanone-1 of the following formula:

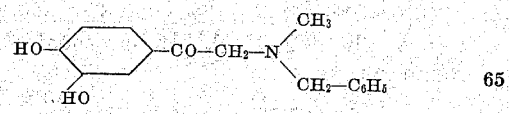

and reduction thereof to 1-(3′.4′-dihydroxyphenyl)-2-methylamino-2-ethanol-1 of the following formula:

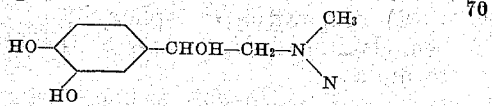

186.5 grams of 1-(3′.4′-dihydroxyphenyl)-2-chloro-ethanone-1 of the following formula:

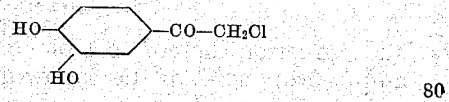

are dissolved in about four times its volume of alcohol and 242 grams of methyl-benzylamine are added drop by drop while stirring. The solution becomes slightly heated and assumes a darker coloration. After it has stood for about one day, it is precipitated with much water, freed from the microcrystalline precipitate by filtering with suction and washed with water and ether. The crude product can be purified by dissolving it in dilute hydrochloric acid and precipitating it carefully with ammonia. It is then a faintly colored microcrystalline powder, which is scarcely soluble in water and ether, fairly readily soluble in alcohol and melts at about 120° C. while assuming a brown coloration. The hydrochloric acid solution assumes an intensive green coloration on addition of iron chloride.

27.1 grams of the 1-(3.4-dihydroxyphenyl)-

2-(N-methyl-benzylamino)-ethanone-1 of the following formula:

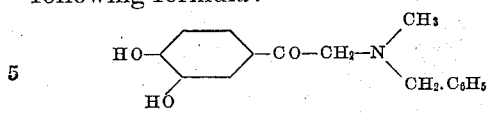

are dissolved in about 50 cc. of 2N-hydrochloric acid and some water and after the addition of an aqueous solution of palladious chloride and gum arabic the whole mixture is agitated with hydrogen at ordinary temperature and under an excess pressure of about one atmosphere, until the theoretical quantity (2 mol) is taken up. The reaction liquor is then distilled with steam whereby the toluene produced passes over. Then the contents of the flask is freed from palladium by filtering it by suction and the aqueous solution is carefully precipitated with ammonia. After filtering by suction, the precipitate is washed with water, alcohol and ether. The microcrystalline precipitate can be purified by dissolving it in an acid and precipitating it with ammonia and then shows the properties of the racemic "suprarenin" base. The final product unlike the starting material is difficultly soluble in alcohol and melts with decomposition at about 212° C. It has the following formula:

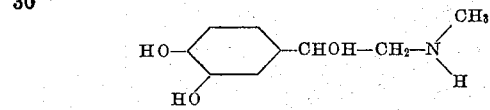

(2) Preparation of 1-phenyl-2-(N-methyl-benzylamino)-propanone-1 of the following formula:

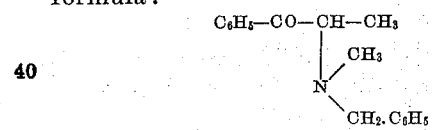

and reduction thereof to 1-phenyl-2-methyl-amino-propanol-1 of the following formula:

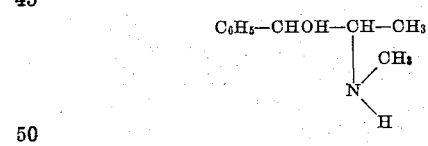

242 grams of methylbenzylamine are introduced drop by drop into 213 grams of 1-phenyl-2-bromopropanone-1 of the following formula:

dissolved in about 4 times its volume of alcohol. The temperature rises slightly and the liquid assumes a somewhat darker coloration. After standing for about one day, it is precipitated with ether, the hydrobromide of methylbenzylamine is removed by filtering with suction and the filtrate is freed from alcohol and ether by distillation. The residue is taken up with ether and agitated with water. The ethereal solution is dried by means of caustic potash, the ether distilled off and the residue distilled in vacuo. The 1-phenyl-2-(N-methyl-benzylamino)-propanone-1 of the following formula:

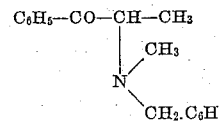

distills over as a feebly colored alkaline oil at a pressure of 14 mm and a temperature of about 197°–198° C.; it crystallizes readily.

The reduction of the 1-phenyl-2-(N-methyl-benzylamino)-propanone-1 is performed as indicated in Example 1. After the toluene has been expelled with steam, the contents of the flask is freed from the palladium by filtration, the remaining liquor is rendered alkaline with caustic soda solution and extracted with ether. After drying and distilling off, there remains 1-phenyl-2-methylamino-propanol-1 with the known properties. The free base melts at 78° C., the oxalate at 254° C. It has the following formula:

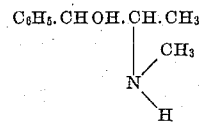

(3) 1-phenyl-2-(N-methyl-benzylamino)-propanone-1 of the following formula:

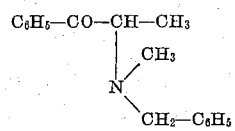

obtained from methylbenzylamine and 1-phenyl-2-bromopropanone-1 of the following formula:

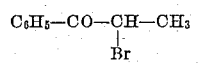

is reduced in an alcoholic or diluted alcoholic solution with palladium black and hydrogen. After reduction has taken place, the catalyst is separated, the filtrate is acidified, the alcohol distilled off, and the residue dissolved in water. The 1-phenyl-2-methylamino-propanol-1 of the following formula:

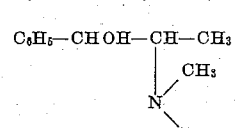

is precipitated from the aqueous solution by means of an alkali and taken up with ether. After the ether has been distilled off there remains an oil from which the amino alcohol is precipitated as oxalate by means of oxalic acid. The oxalate melts at a temperature of 254° C., whereas the alcohol base obtained from the oxalate melts at a temperature of 78° C.

(4) 25 grams of the hydrochloride of 1-phenyl-2-(N-methylbenzylamino)-ethanone-1 of the following formula:

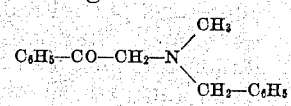

obtained by causing methylbenzylamine to act upon 1-phenyl-2-bromo-ethanone-1 of the following formula:

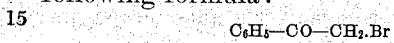

in a benzene solution, are dissolved in 200 cc. of water and, after the addition of a nickel-catalyst, hydrogenated in an autoclave at a temperature of about 90° C. under a pressure of 50 atmospheres, while using hydrogen. The catalyst is then filtered by suction, the eliminated toluene is isolated and the solution of the hydrochloride of 1-phenyl-2-methylamino-ethanol-1 of the following formula:

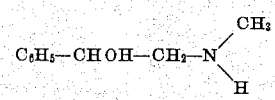

thus obtained is supersaturated with an alkali. The separated base is taken up with ether; it is left, after the ether has been expelled, as a colorless crystalline mass which has its melting point at 78° C.

(5) 1-phenyl-2-(N-methyl-benzylamino)-propanone-1 of the following formula:

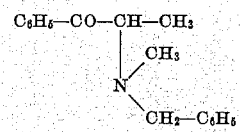

obtained by causing methylbenzylamine to act upon 1-phenyl-2-bromopropanone-1 of the following formula:

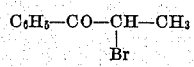

is dissolved in 2N-hydrochloric acid and, after the addition of the nickel-catalyst, hydrogenated for about one hour at a temperature of between 90° C. and 100° C. and under a pressure of 40 atmospheres, while using hydrogen. The solution, after being separated from the catalyst and the formed toluene, is supersaturated with an alkali and the 1-phenyl-2-methylamino-propanol-1 of the following formula:

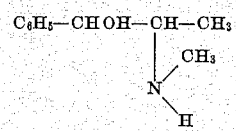

is extracted with ether. The base melts after re-crystallization from cyclohexane at a temperature of 78° C., whereas the hydrochloride melts at 189° C.

(6) By causing methylbenzylamine to act upon 1-(4-hydroxyphenyl)-2-chloro-ethanone-1 of the following formula:

in an alcoholic solution the 1-(4-hydroxyphenyl)-2-(N-methylbenzylamino)-ethanone-1 of the following formula:

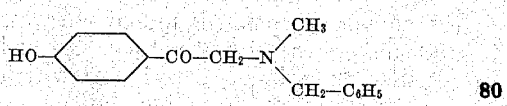

is obtained which crystallizes from alcohol in lamellæ. Its hydrochloride forms colorless crystals of the melting point 222° C.-224° C., which are easily soluble in water and alcohol, more difficulty in acetone.

29.15 parts of the hydrochoride of 1-(4-hydroxyphenyl)-2-(N-methyl-benzylamino)-ethanone-1 are dissolved in 200 parts of water and, after the addition of a nickel-catalyst, hydrogenated for about one hour at a temperature of between 80° C. and 90° C. and under a pressure of 40 atmospheres while using hydrogen. The solution, after being separated from the eliminated toluene and the catalyst, is freed from the dissolved metal by means of potassium ferrocyanide or ammonium sulfide and the 1-(4-hydroxyphenyl)-2-methylamino-ethanol-1 of the following formula:

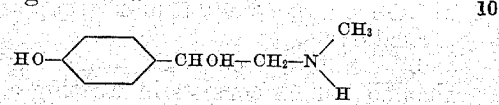

is precipitated from the filtrate by means of potassium carbonate. It forms a white crystalline powder which is difficulty soluble in water and alcohol and which melts at a temperature between 183° C. and 184° C. The hydrochloride is readily soluble in water and melts at a temperature of between 152° C. and 153° C.

(7) 1-phenyl-2-(N-methyl-benzylamino)-propanone-1 of the following formula:

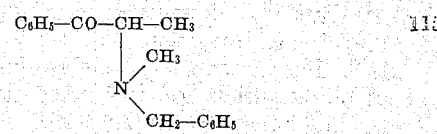

obtained by causing methylbenzylamine to act upon 1-phenyl-2-bromopropanone-1 of the following formula:

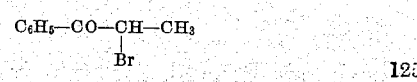

is dissolved in alcohol or diluted alcohol and hydrogenated for about one hour in the presence of a nickel-catalyst at a temperature of between 80° C. and 90° C. and under a pressure of about 40 atmospheres while using hydrogen. The alcoholic solution, after being separated from the catalyst, is acidified, the alcohol is filtered off by suction and the salt is taken up with water. To separate the resulting 1-phenyl-2-methylamino-propanol-1 of the following formula:

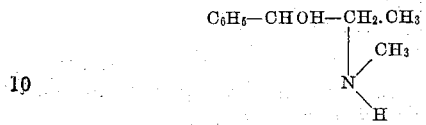

the aqueous solution is mixed with an alkali and then extracted with ether. After having distilled the ether, a base is left which, after re-crystallization from cyclohexane, melts at a temperature of between 77° C. and 78° C.

In the following claims the term catalyst of the iron group comprises iron, nickel and cobalt catalysts themselves or in mixture.

We claim:

1. The new process of preparing amino alcohols, which consists in treating a ketone of the general formula:

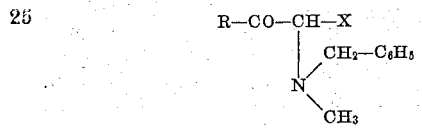

wherein R stands for a phenyl radical which may be mono (4) or di-(3.4) substituted by hydroxy and X stands for hydrogen or methyl with hydrogen in the presence of a catalyst of the group consisting of catalysts of the iron and the platinum group and copper catalysts.

2. The new process of preparing amino alcohols, which consists in treating a ketone of the general formula:

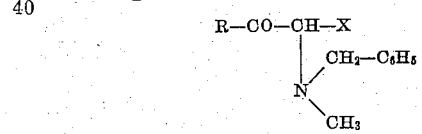

wherein R stands for a phenyl radical which may be mono-(4) or di-(3.4) substituted by hydroxy and X stands for hydrogen or methyl with hydrogen in the presence of a catalyst of the group consisting of palladium and nickel catalysts.

3. The new process of preparing amino-alcohols which consists in treating a ketone of the general formula:

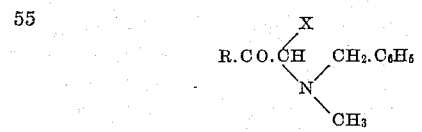

wherein R stands for a phenyl radical which may be mono-(3) or di-(3.4) substituted by hydroxy, X stands for hydrogen or methyl, with hydrogen in the presence of a palladium catalyst.

4. The new process of preparing amino-alcohols which consists in treating a ketone of the general formula:

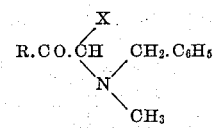

wherein R stands for a phenyl radical which may be mono-(3) or di-(3.4) substituted by hydroxy, X stands for hydrogen or methyl, with hydrogen in the presence of a nickel catalyst under a pressure of approximately 40 atmospheres and at a temperature between about 80° C. and about 100° C.

In testimony whereof, we affix our signatures.

FRIEDRICH STOLZ.
KARL BÖTTCHER.
JULIUS HALLENSLEBEN.
WALTER KROHS.